April 28, 1936.   B. M. HOBLICK   2,038,790
FRUIT BOX LINER
Filed April 9, 1935
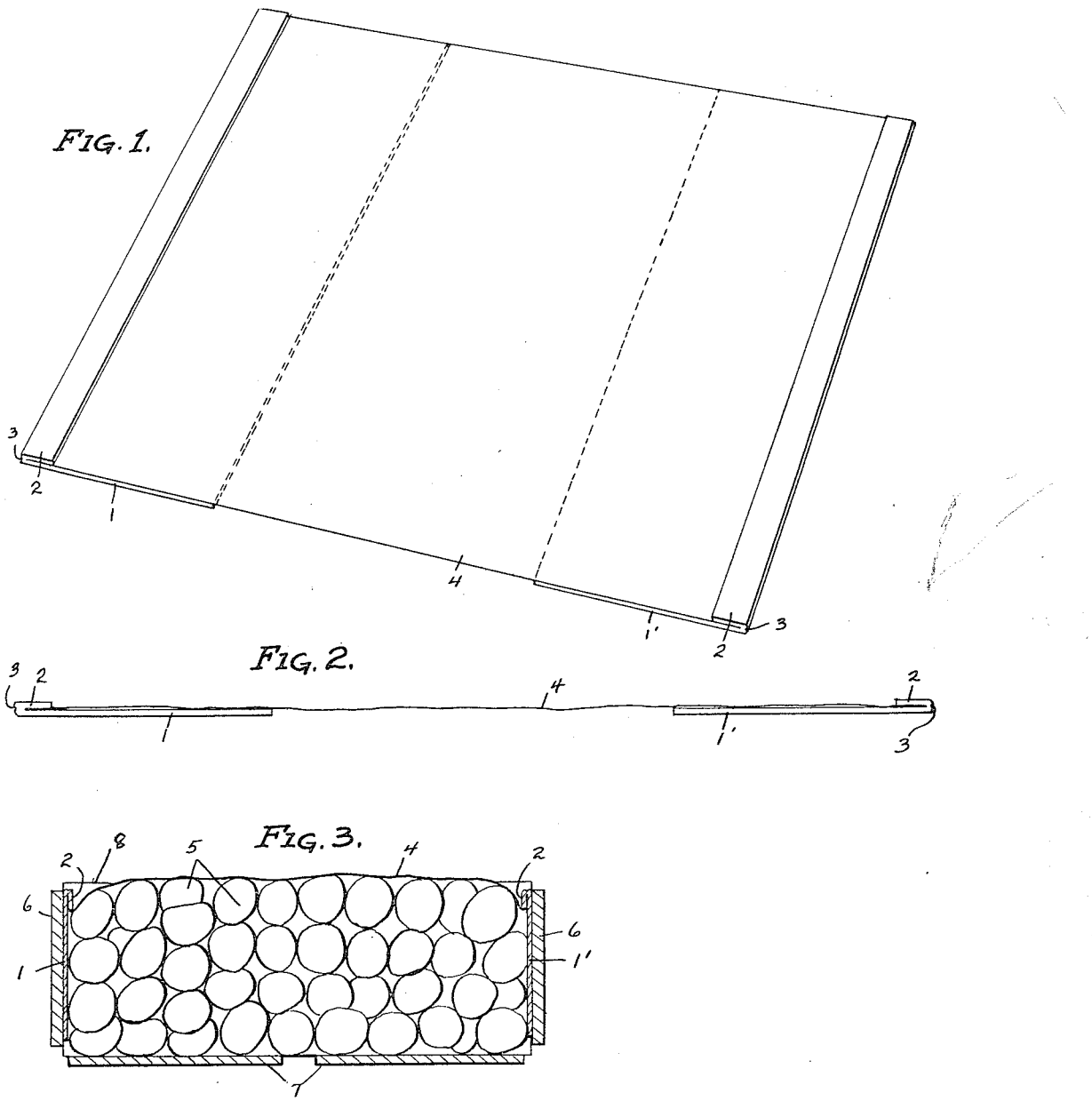
INVENTOR.
BENJAMIN M. HOBLICK
BY
Miller Boyken & Bried
ATTORNEYS.

Patented Apr. 28, 1936

2,038,790

UNITED STATES PATENT OFFICE 2,038,790

FRUIT BOX LINER

Benjamin M. Hoblick, Fresno, Calif., assignor to Blake, Moffitt & Towne, San Francisco, Calif., a corporation of California Application April 9, 1935, Serial No. 15,429

6 Claims. (Cl. 217—3)

This invention relates to fruit box liners of the character shown in my copending patent filed March 13, 1935, under Serial No. 10,806, which consists broadly of a strip of cardboard to the margin of which is attached a thin flexible curtain of transparent cellulose, two of the strips and curtains being used in each box of fruit. The objects of the present invention are to provide an improvement over the disclosure of my copending case in a liner of this kind which will be cheaper to make and apply.

In the accompanying drawing Fig. 1 is a perspective view of my improved transparent curtain liner.

Fig. 2 is an end view of the liner with the thickness of the materials shown exaggerated.

Fig. 3 is a cross section of a fruit box filled with fruit and my improved liner in place with the curtain covering the top of the fruit.

In further detail the liner comprises two strips of any thin cardboard 1, 1', or what is known in the trade as "chip board" being a suitable grade, each having its margin 2 scored at 3 and doubled over against the body of the card and embracing one of the opposite margins of a relatively large sheet 4 of a thin flexible sheet or "curtain" of preferably transparent or translucent cellulose, "cellophane", or other thin sheet. The folded over margins of the cardboard are secured in place by any suitable means such as by wire stapling, glue, or cement, so that the thin glossy transparent curtain of cellulose will be firmly clamped and held securely within the two layers of cardboard.

The length of the cardboard strips is such as to fit easily within the ends of the size fruit box desired, the width of the strips may be anywhere from about the depth of the box to about a quarter of its depth, or sufficient to give it strength for shoving edgewise down between the fruit and the sides of the box after the box is packed. The curtain is about the same length as the cardboard strips and is of a width to extend clear across the arched pack of fruit as shown at 4 in Fig. 3 wherein the fruit is designated 5, the box side walls 6, bottom boards 7 and end walls 8. The filled and lined box here shown is ready to have its cover boards nailed on over the curtain 4.

In Fig. 3 the cardboard strips 1 and 1' are shown shoved down between the side walls 6 of the box and the fruit with the margins 2 facing one another, but they may be inserted facing outward if desired, though this would require a slightly wider curtain sheet.

In applying the improved liner, one of the strips of cardboard may be first inserted before the box is entirely packed, the packing completed, the curtain draped over the fruit, and after filling the box the other strip pushed in place until the curtain is brought smoothly over the fruit. Or, of desired, the box may be completely packed and the strips pushed in place.

Since the strips need only be stiff enough to push in place between the fruit and box it is evident that thick stiff paper could be used in place of cardboard, but the cardboard is much to be preferred as it may be shoved in place in an instant without danger of breaking or creasing.

It is manifest that one of the stiff marginal strips 1 or 1' could be omitted while still yielding several of the advantages of the invention.

Besides the advantages of simplicity and cheapness, the present liner having a curtain without joint extending over the entire surface of the fruit is more effective in excluding dust and dirt, and also displays the fruit to better advantage when the box is opened.

While I term the invention a fruit box liner, and its chief value is for packing fresh fruits, such as grapes, or other fruit subject to easy injury, no limitation is to be implied thereby as it is useful in packing any goods requiring the same protective measures.

Having thus described my invention, what I claim is:

1. A box liner comprising a thin flexible curtain of a size to extend entirely across the top surface of a packed box and opposite margins of said curtain secured to strips of cardboard adapted to be positioned between the goods and the box side walls, said cardboard strips having their margins folded over and embracing the margins of the curtain and cemented thereto.

2. A box liner comprising a thin flexible curtain of a size to extend entirely across the top surface of a packed box and opposite margins of said curtain secured to strips of cardboard adapted to be positioned between the goods and the box side walls, said cardboard strips being of lesser height than the depth of the box in which they are to be used.

3. A box liner comprising a thin flexible curtain of a size to extend entirely across the top surface of a packed box and opposite margins of said curtain secured to strips of cardboard adapted to be positioned between the goods and the box side walls, said curtain being of transparent cellulose or the like and said cardboard strips being of a rigidity adapting them to be shoved down between the side walls of the box and a filling of fruit packed therein.

4. A box liner comprising a pair of cardboard strips each scored along one margin and the margin doubled over against the body of the card, and a relatively large sheet of transparent "cellophane" or the like gripped by its opposite margins respectively between the folded over margin of the strips and secured firmly therebetween.

5. A box liner comprising an elongated strip of cardboard adapted to stand along the side wall of a box and provided with a flap of thin flexible transparent cellophane-like material, said flap being wider than the cardboard strip and secured along one margin to one margin of the cardboard strip, and adapted to be extended over the packed contents of the box, said cardboard strip being of a rigidity adapting it to be shoved down between the side wall of the box and a filling of fruit packed in the box.

6. A box liner comprising an elongated strip of cardboard adapted to stand along the side wall of a box and provided with a flap of thin flexible transparent cellophane-like material, said flap being wider than the cardboard strip and secured along one margin to one margin of the cardboard strip and adapted to be extended over the packed contents of the box, said cardboard strip being folded over along one margin so as to embrace the edge of said flap.

BENJAMIN M. HOBLICK.